United States Patent [19]

Menzies

[11] Patent Number: 4,566,868
[45] Date of Patent: Jan. 28, 1986

[54] PRESSURE SOURCE

[75] Inventor: Bruce K. Menzies, Walton-On-Thames, England

[73] Assignee: Geotechnical Digital Systems Limited, Surrey, England

[21] Appl. No.: 301,084

[22] Filed: Sep. 11, 1981

[30] Foreign Application Priority Data

Sep. 17, 1980 [GB] United Kingdom ............... 8030082

[51] Int. Cl.[4] ................. F04B 49/06; F04B 49/08; F04B 35/04; G01N 3/10
[52] U.S. Cl. ................................. 417/572; 73/807; 73/825; 417/415; 417/18
[58] Field of Search ................ 417/12, 38, 186.22, 417/42, 43, 53, 415; 73/807, 825; 91/362; 222/63

[56] References Cited

U.S. PATENT DOCUMENTS

| 3,199,341 | 8/1965 | Heuer, Jr. et al. | 73/820 |
|---|---|---|---|
| 3,666,141 | 5/1972 | Ma et al. | 222/63 |
| 3,847,507 | 11/1974 | Sakiyama | 417/42 |
| 3,882,861 | 5/1975 | Kiettering | 417/44 |
| 3,915,651 | 10/1975 | Nishi | 417/12 |
| 3,966,358 | 6/1976 | Heimes | 417/12 |
| 4,076,458 | 2/1978 | Jones | 417/67 |
| 4,137,913 | 2/1979 | Georgi | 604/67 |
| 4,209,258 | 6/1980 | Oakes | 417/43 |
| 4,259,038 | 3/1981 | Jorgensen | 417/53 |
| 4,299,541 | 11/1981 | Ohara | 417/12 |
| 4,313,075 | 1/1982 | Stewart | 222/63 |
| 4,321,014 | 3/1982 | Eborn | 417/53 |
| 4,326,837 | 4/1982 | Gilson | 417/63 |
| 4,331,262 | 5/1982 | Snyder | 222/63 |
| 4,336,000 | 1/1982 | Jorgenson | 73/869.16 |
| 4,339,699 | 7/1982 | de Jones | 318/596 |
| 4,396,385 | 8/1983 | Kelly | 417/22 |
| 4,397,610 | 8/1983 | Krohn | 417/44 |

FOREIGN PATENT DOCUMENTS

| 2950412 | 6/1980 | Fed. Rep. of Germany | 417/18 |
|---|---|---|---|
| 1441983 | 7/1976 | United Kingdom | 417/12 |
| 687256 | 9/1979 | U.S.S.R. | 417/18 |

Primary Examiner—William L. Freeh
Attorney, Agent, or Firm—Robert T. Gammons

[57] ABSTRACT

A liquid pressure source, e.g. for use in soil mechanics laboratories, has a piston-cylinder unit driven by a stepper motor: a pressure transducer indicates the liquid pressure and a digital feedback control unit responds to generate stepping pulses to maintain a desired pressure. A step counter can be included to provide an accurate indication of volume change, and backlash compensation may be provided by arranging that the counter, following a direction change, ignores motor steps until a pressure change occurs.

14 Claims, 4 Drawing Figures

PRESSURE SOURCE

This invention relates to a liquid pressure source and particularly, though not exclusively, to a digitally controlled pressure source suitable for use in providing a source of constant pressure such as required in soil mechanics laboratories.

According to the present invention there is provided a liquid pressure source comprising a piston-cylinder unit, a stepping motor arranged for operation of the piston-cylinder unit, a pressure transducer arranged to produce an electrical signal indicating the liquid pressure at the output of the piston-cylinder unit, and digital feedback control means responsive to the transducer signal to provide stepping pulses to the motor.

In a preferred arrangement the source includes means arranged in operation to count stepper motor pulses so as to indicate changes in volume: to compensate for backlash in the system it may be arranged whenever the motor changes direction, to cease counting pulses until the pressure transducer signal has changed by a predetermined amount. The ball screw as illustrated is of the kind shown in the publication Unimetic Enginous Short-form Catalogue, pages 2, 3 and 4-Unimetic Enginous Limited 122 Granville Road, Cricklewood, London.

The device may also include means arranged in operation, when a motor step has been effected, to compute the change between the transducer signal before and after the step, and to suppress further motor steps unless or until the difference between the target and transducer sigals is at least equal to half the said change.

The invention will be described by way of example with reference to the accompanying drawings, in which.

Figure 1:
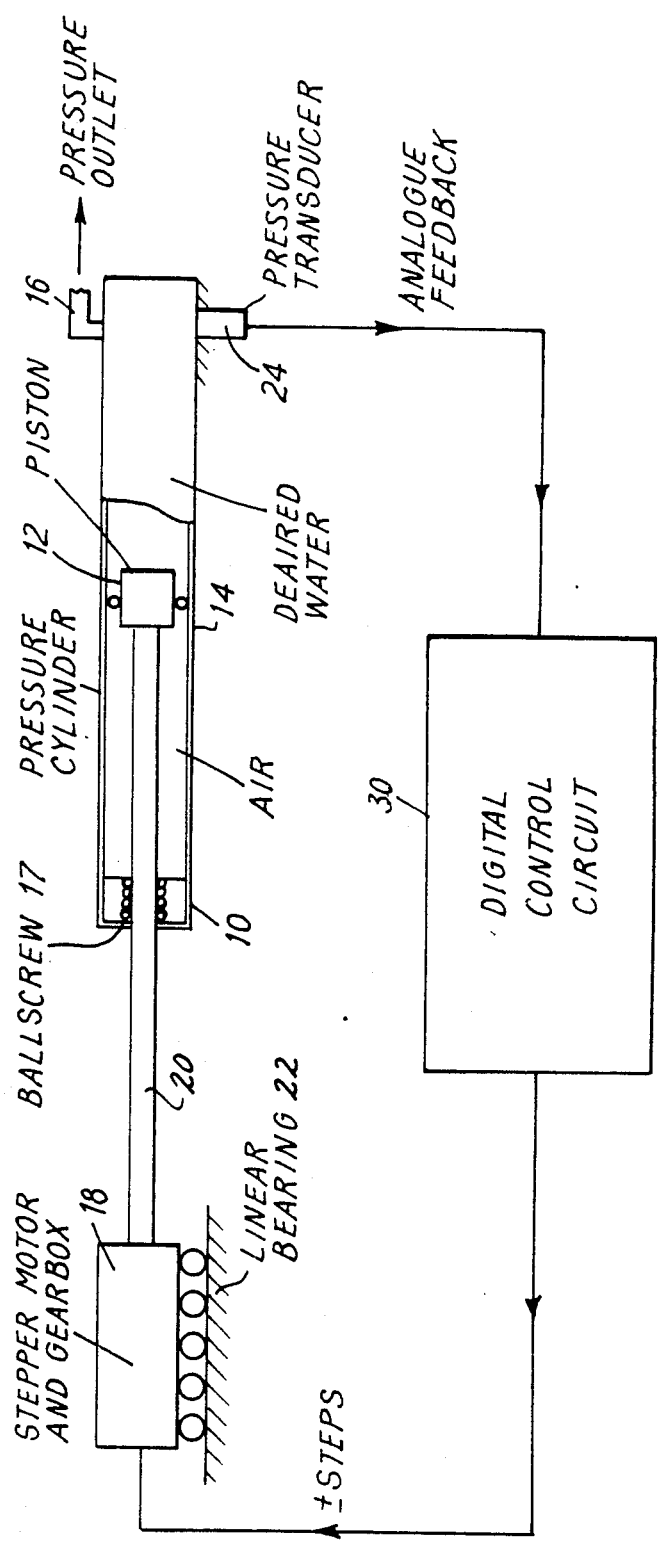
FIG. 1 is a schematic diagram of a pressure source embodying the invention.

Referring to FIG. 1, the pressure source comprises a piston-cylinder unit 10 with a piston 12 accommodated in a pressure cylinder 14. The volume on the working side of the piston is occupied by de-aired water which provides the required pressure at an outlet 16. Movement of the piston to pressurise/displace the water is effected by a stepper motor 18 with associated gear box: rotary motion of the motor/gearbox output is converted into linear motion by means of a threaded piston rod 20 which runs in a recirculating ballscrew 17 secured to the cylinder 14. As shown the motor/gearbox unit 18 is allowed to move with the piston, and is supported on a linear bearing 22 again using recirculating balls.

The pressure cylinder 14 contains a transducer 24 which senses the pressure of the water. An electrical signal from this transducer is fed back to a digital control unit 30 which provides a feedback control system to the stepper motor.

One typical application of the pressure source described is for use in a soil mechanics laboratory, to generate, measure and log changes in both pressure and volume. For example as a constant pressure source it can replace mercury column, compressed air and dead weight devices. For this application, the dimensions of the system may typically be such that one step of the motor causes the piston to displace 1 mm$^3$ of volume.

Figure 2:
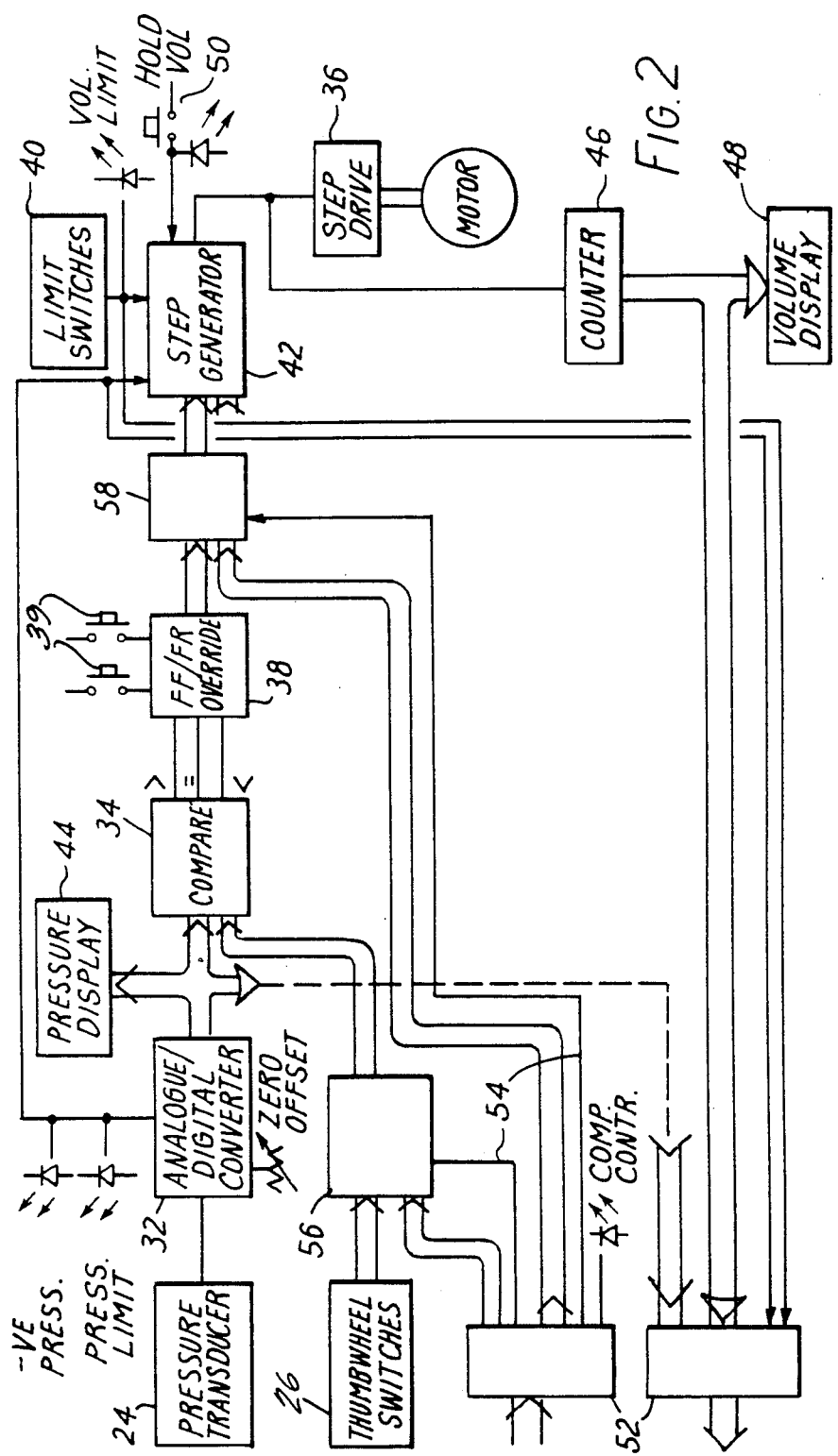
FIG. 2 is a block circuit diagram of the control circuit for the pressure source.

As shown in FIG. 2 the servo loop comprises the pressure transducer 24, an analogue to digital (A/D) converter 32, a comparator 34 for comparing the digital output with a "required pressure", the output of which controls a stepper motor drive 36. The analogue to digital conversion is performed repeatedly at a rate of typically 60 times per second. At completion of each conversion the result is compared in the comparator 34, and if the measured pressure does not equal the required pressure, a single step pulse is issued to the stepper motor. In the example described this causes the stepper motor to rotate 1.8°, driving the piston 12 via the stepper motor gearbox, to effect a 1 mm$^3$ volume change in the cylinder 14 in the sense so as to decrease or increase the pressure and minimise the pressure error. This pressure change will, of course, be sensed by the pressure transducer 24, and allowed for in the next A/D conversion cycle.

The unit can operate in a "stand alone" mode in which case the required pressure is set on a 4 digital thumbwheel switch 26 which is set manually on the control panel of the unit. When a pressure is dialed in to these switches, a signal from the thumbwheel switches is applied for comparison in the comparator 34, and the servo system will drive the piston 12 until the pressure detected by the transducer 24 equals the required pressure. This pressure is then held with the stepper motor exerting a holding force to prevent any movement.

The comparison result can be overridden by a fast forward/fast reverse control 38. This comprises manually operated controls 39, which are incorporated so as to allow the piston to be positioned quickly prior to running a test. Operating either of these two switches causes the stepper motor 10 to be driven at a rate of around 1,000 steps per second in the required direction.

The circuit can include various features to protect the pressure control unit from damage in the event of misuse or procedural errors in operation. In particular, two detectors can be used to indicate when the piston approaches the limit of available travel. These are shown in FIG. 2 as volume limit error detectors 40. These can inhibit further movement of the piston. The A/D converter 32 also generates two signals indicating respectively negative pressure, or an excess pressure applied to the transducer 24 (termed polarity error and overrun respectively). Detection of such an error condition will result in a red flashing light emitting diode (LED) being displayed on the control panel, and the increase/decrease volume decision being overruled in a logic gate 42, the motor being stepped then in the direction appropriate to correct the error.

The digitised pressure reading can be displayed on the control panel as a 4 digit 8 segment LED display. This is indicated at 44 in FIG. 2. Step pulses applied to the stepper motor also increment or decrement a counter 46 the value of which can also be displayed on a 6 digit 8 segment LED display 48. This count can be set to zero by a zero reset switch on the control panel, and will thereafter represent the cumulative volume change in cubic millimeters necessary to obtain the required pressure.

Two additional controls can be provided on the control panel, namely a hold control switch 50 and a zero offset adjustment for the A/D converter. When the hold volume is set, the piston will be held in position by the stepper motor holding force, irrespective of the detected pressure. The zero offset facility allows the detected pressure to be set to zero over an absolute pressure range of approximately 100 kPa, enabling a pressure resulting from the "head" of water between the device and the test specimen to be eliminated.

As shown in FIG. 2, the illustrated unit preferably includes an IEEE-488 instrumentation standard interface 52, thus enabling all the essential operations of the unit to be controlled remotely by a computer, and data from the unit to be monitored and recorded for subsequent analysis. Pressure and volume information is continuously made available to the interface, together with all error conditions. This can be monitored without the computer effecting any control.

When the unit operates as a peripheral, controlled by a computer, the computer issues a command to the unit through the interface output 54 detailing pressure or volume control. A pressure control command will be followed by the required pressure, and the unit will ignore the thumbwheel setting, by means of a changeover switch 56, and use the computer specified pressure as the reference pressure. Computer volume control overrules the output of comparator 34 by means of a changeover switch 58, and causes the stepper motor to execute a single step. The command also indicates the required direction of movement. It should be noted that the computer volume control does not overrule the error detection.

A non-flashing LED on the control panel indicates that computer control is in operation, which may be cancelled either by the computer, or by operating the zero reset switch. The unit has a considerable number of practical advantages. In particular it is easy to use in the manual mode, in that the required pressure is very simply set on a digit switch. The unit can be fully self contained and is compact and portable. Setting up is very simple. No more than mains supply and connection of the pressure outlet is required. Nevertheless the unit gives the accuracy of digital processing together with displays of pressure and volume change. The unit can be used in the computer operated mode as a specialised peripheral for automated test control and data logging.

Figure 3:
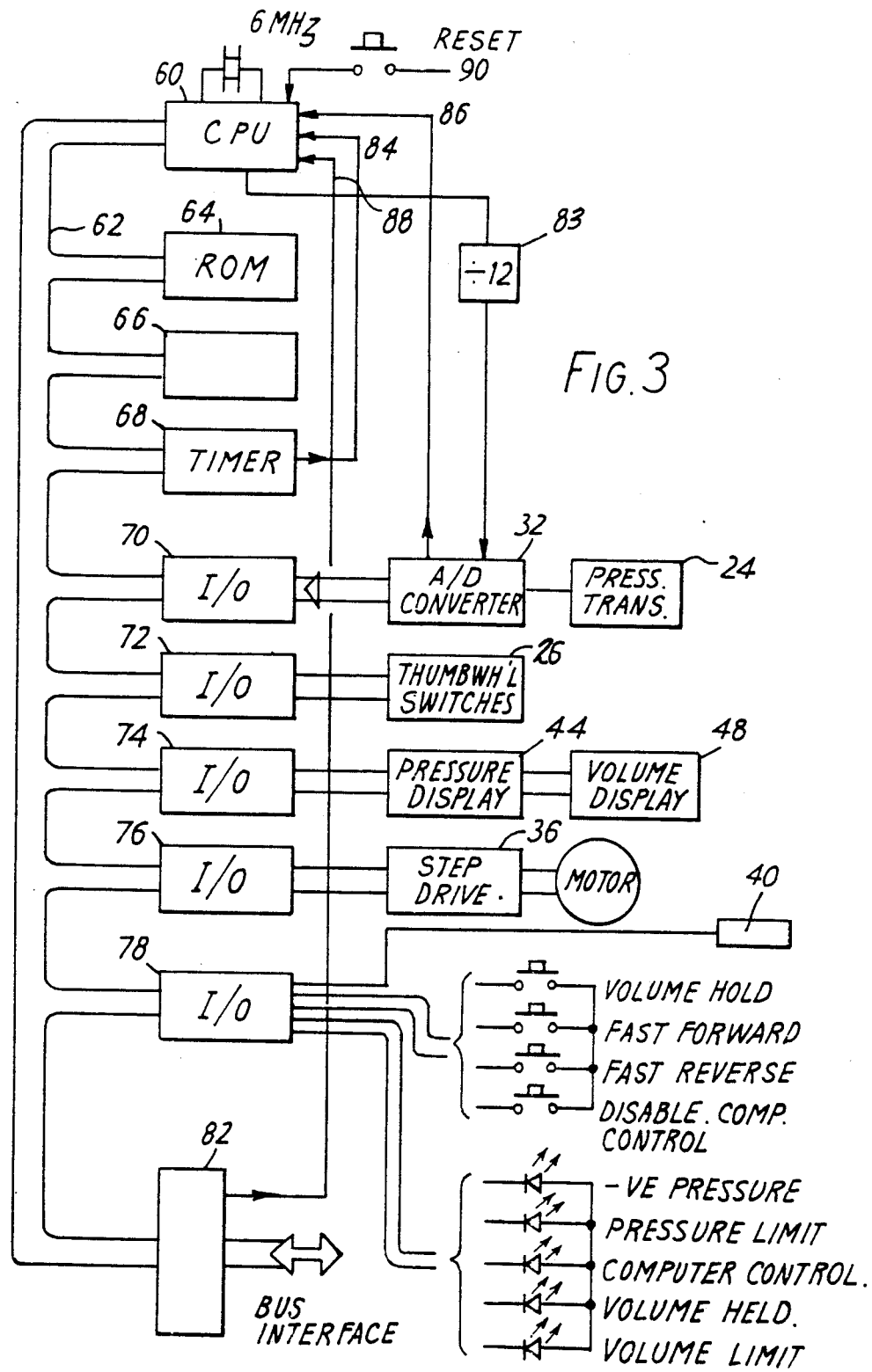
FIG. 3 is a block circuit diagram of an alternative, microprocessor based, control unit.

FIG. 3 shows an alternative embodiment of digital control unit, employing a microprocessor 60 which is connected via address, data and control buses 62 to a read-only memory 64 containing a program for control of the system, read-write memory 66, an interval timer 68, and input and output (I/O) ports (described below). As before, the pressure transducer 24 feeds an analogue to digital converter 32 interfaced to the bus via I/O port 70. The thumbwheel switches 26 for manual pressure setting and 7-segment L.E.D. displays 44,48 for pressure and volume readout are connected via ports 72, 74, whilst ports 76,78 and 80 serve the stepper motor drive 36, limit switches 40 and manual control buttons and L.E.D. indicators. Again, an IEEE standard interface for external computer control is provided by an interface unit 82.

Clock pulses for the analogue to digital converter are obtained via a divider 83 from the CPU clock. For example, using an Intel 8085 microprocessor with a 6 MHz clock, 250 kHz pulses for an ICL 7109 A/D converter can be obtained using a 1/12 divider. Outputs from the timer 68, A/D converter 32 and bus interface unit 82 are connected to respective interrupt inputs 84, 86, 88 of the microprocessor (in that order of interrupt priority). A CPU reset button 90 is also provided.

Figure 4:
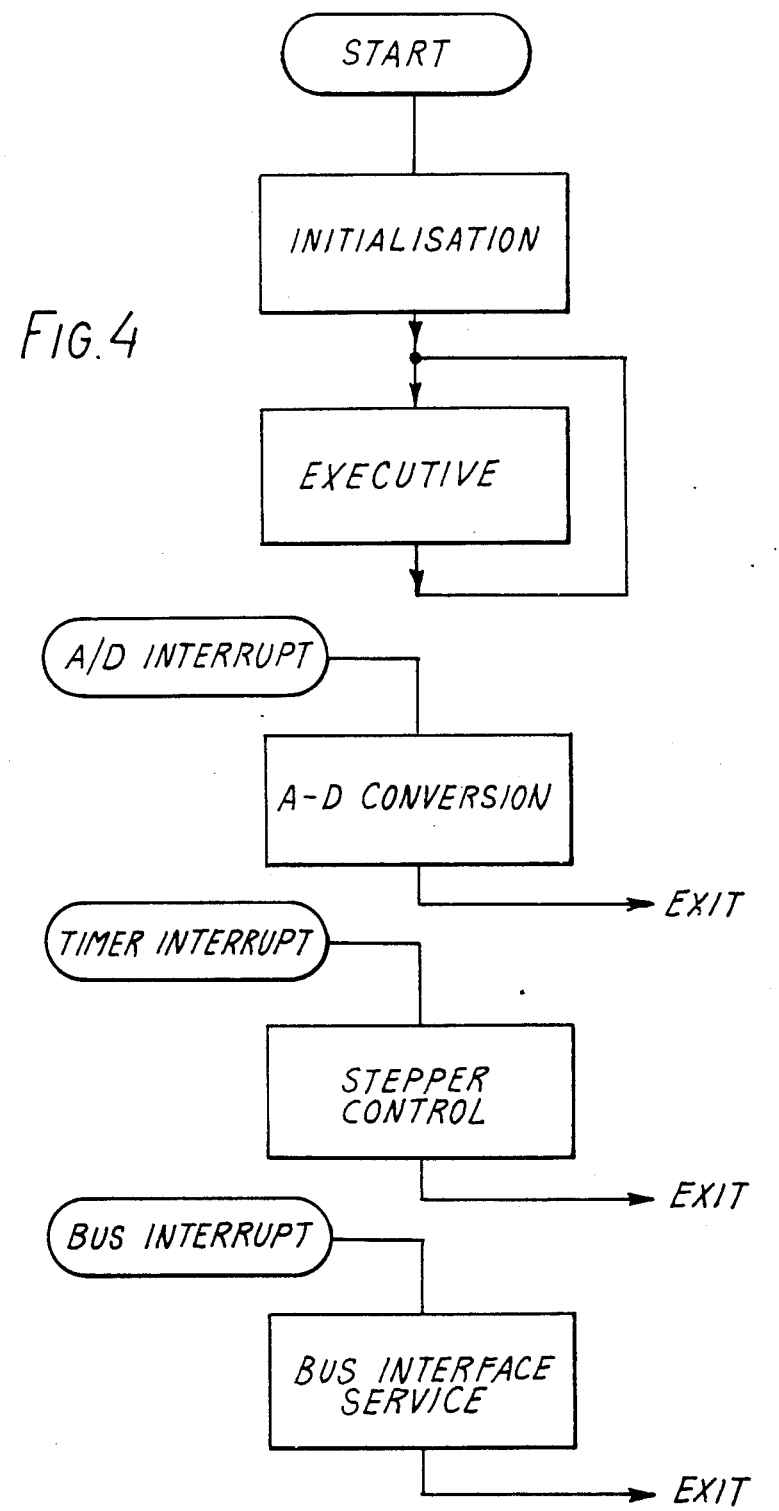
FIG. 4 is a flow chart for operation of the unit of FIG. 3.

The program stored in the ROM 64 (firmware) is arranged to control the operation of the pressure source, as indicated in outline in the flowchart of FIG. 4. Upon power up (or manual reset via reset switch 90), an initialisation sequence is entered to initialise memory locations, and start the timer 68 and A/D converter 32. There then follows an "executive" sequence which is a continuous loop (unless the CPU is reset or interrupted — see below). This performs the following functions:

(a) Drives the displays of current pressure, volume and all LED indications.
(b) Monitors the existence of errors and sounds the audible alarm as required.
(c) Monitors the zero/reset button and enters the initialisation phase when it is pressed.

The analogue to digital converter 32 signals completion of an A/D conversion by an interrupt which causes the CPU to jump to an A/D converter service routine in memory 64. This carries out the steps of:

reading a 12-bit binary representation of the current pressure from the A/D converter via the I/O port 70. The pressure transducer is calibrated so that the full 12-bits represents the full pressure range for the device (e.g. 1024 K Pa or 2048 K Pa), although the program may include steps for appropriate conversion.

storage of the 12-bit word in memory 66 for internal calculation.

conversion to BCD (binary coded decimal) format, the BCD value being stored in memory 66, so that the executive can pass the pressure data to the pressure display 44 via the I/O port 74, and also output to the bus interface unit 82 for transmission to a host computer if required.

In addition, where a step has been made in the motor position, the ADC service routine computes the difference between the preceding pressure reading and the current reading to enable prediction of the effect of further steps of the stepper motor. This difference is stored in the memory 66 for use by the stepper motor service routine.

After these functions have been carried out, the A/D converter is reset and control reverse to the executive.

Entry into the stepper motor service routine is triggered by an interrupt from the timer 68. In addition to taking a decision as to whether a step should be initiated, whenever a step takes place (subject to modification for backlash correction), a count in memory is incremented or decremented — according to direction, this maintaining a record of the volume change which the executive outputs to the LED display and also is output to the bus interface. Of course, if the system is in "volume change" mode the motor will simply be driven by the appropriate number of steps to reach the required volume — usually at maximum stepping speed, whereas in pressure control mode the system will normally drive at a stepping rate synchronous with A/D conversion in order not to overshoot the target pressure.

The control of the stepper motor distills down to a decision of step or no step. However, many complex decisions and adjustments need to be made to achieve that distillation. The following list of parameters affect the decision:

Manual control
Computer control
Pressure control
Volume control

Stiffness of the system
Electrical noise
Mechanical noise (backlash)
Speed
Accuracy
Removal of oscillation.

In concept the control of the servo loop is straightforward; a target needs to be attained, if the system is not at the target then a step toward the target needs to be initiated. Under volume control this algorithm is adequate and efficient because one step causes a change in volume of one cubic millimeter. Hence the target can be approached exactly without oscillation. Under pressure control application of the same algorithm does not give conveyance for many reasons, the major reason being that a single step of the motor can cause a pressure difference from fractions of a kPa to many kPa.

The basis of the over-all control is a servo loop consisting of the pressure transducer, an analogue to digital (A-D) converter, a comparison of this digital result with 'required pressure', the result of which controls the stepper motor. As before, the pressure control can be overridden by manual fast forward and fast reverse buttons.

If there is little air in the system and if the pressure cylinder, pressure lines and connections are fairly rigid, then a sealed system is very stiff indeed and a small displacement of the piston will cause large pressure changes. This is particularly so at high pressures when any residual air in the system passes into solution in the water which then becomes highly incompressible. For example, a single step of 1 mm³ piston displacement could cause a pressure change of several kPa. Accordingly, as mentioned above, the pressure change caused by the last step has been recorded, effectively measuring the stiffness of the entire test assembly, including the pressure cylinder, pressure lines and (for example) test cell and soil test specimen.

From the previous step the system learns what pressure change was generated by the most recent step and expects that the next single step will generate the same pressure change. In order to approach a target pressure as closely as possible, a decision is taken:

no step if $P_t - P_m \leq 0.5 \, \delta p_s$ step if $0.5 \, \delta p_s < (P_t - P_m)$ where
$P_t$ = target pressure
$P_m$ = current measured pressure
$\delta P_s$ = step pressure difference Thus for a step of 0.5 mm³, if the difference between the target pressure and the measured pressure is less than half the pressure difference caused by a change in volume of 0.5 mm³, no step is attempted, otherwise a step is carried out.

This approach has two positive benefits.
(a) The target pressure is approached to within the pressure difference caused by a change in volume of 0.25 mm³.
(b) Oscillation due to inequality between target pressure and measured pressure is removed.

This procedure ensures that the target pressure is approached as accurately as possible. However, a rigid application of this algorithm means that the target pressure is approached at a rate of one step of 0.5 mm³ every A-D cycle, or approximately 30 steps per second. This approach limits the dynamic performance of the device.

Using the converter and clock frequency mentioned above, the A-D cycle takes between 20 and 30 milliseconds to complete. The stepper motor is capable of a step every millisecond. In order that a target pressure may be approached quickly it is desirable that the motor work at full speed, however the system only knows the new pressure every 20 to 30 milliseconds. To enhance the dynamic performance the following algorithm is employed when $(P_t - P_m) \geq 2\delta P_s$. $N_s$ steps are taken where $N_s$ 15 calculated as $$N_s = INT\left[\frac{(P_t - P_m)}{\delta P_s}\right] - 1$$

and $N_s$ is limited by $N_s \leq 16$.

In this manner where a large discrepancy exists between the target and measured pressures the device executes multiple steps per A-D cycle in order to approach the target pressure quickly.

In order that the new pressure generated as a result of a number of steps is calculated accurately it is necessary to ensure that no steps occur during the A-D cycle following the steps; this is achieved by means of a step interlock flag.

In addition, compensation is provided for mechanical slack in the system. There are two primary sources of mechanical backlash in the system; the gearbox, and the rubber 'O' ring seal in the piston. The effect of the backlash is such that when the motor changes direction no change in piston position occurs until the backlash is taken up. This causes two problems:
(a) There is no pressure change generated by steps during the backlash (or slack) stepping period and hence calculation of step pressure difference is distorted.
(b) The calculation of volume change from the number of steps carried out is also distorted because steps during this slack period only take-up backlash and do not contribute toward piston movement or volume change.

Correct calculation of step pressure differences is achieved by ensuring that the step pressure differences is not calculated while the system is slack. In this case the test applied for no slack is that the piston must have displaced at least 6 mm³ in the same sense since the last reversal of direction.

The backlash correction on volume change measurement is carried out every time the motor changes its sense of rotation. At this time, and during the period of backlash only, the stepping rate is adjusted to be synchronous with the A-D conversion rate (30 times a second) and the number of steps required to produce a change in pressure (in the least significant bit) is noted. This is the fictitious "volume change" in mm³ owing to backlash and is subtracted from the volume change register. In this way, the volume change is corrected for backlash.

Thus, (i) When the piston reverses direction all steps are ignored with regard to calculating volume change until the pressure alters in the least significant bit.

and (ii) All ignored steps are accounted for separately in terms of both sense and number and the summation of steps ignored is limited to be less than 3 mm³.

By applying the above limited volume change correction technique the accuracy of volume change measurement for small changes (1–1000 mm$^3$) is improved and cumulative creep in volume change measurement is prevented.

In a stand alone system (one pressure controller maintaining the pressure of a non-dynamic system) or a shared system (more than one pressure controller maintaining pressures in an interlinked system; e.g., the Triaxial cell), there are a number of factors which can lead to system oscillation:

(i) In a pressurised air-water system the characteristics of air absorption show a marked hysterisis.
(ii) Electrical noise causes minor fluctuations in pressure transducer output and/or A-D conversion result.
(iii) In shared systems the asynchronous nature of the control system can cause the pressure controllers to compensate for pressure changes in such a manner that water is pumped to and fro at marginal pressure differences.

As described previously the calculation of step pressure difference is only made if a step occurred during the previous A-D cycle and the system has made at least six steps (=6 mm$^3$) in the same direction since a reversal of direction; also the step pressure difference is fundamental to the step/no step decision. By artificially increasing the step pressure difference each time the system reverses direction, within the limits of calculating the step pressure difference (six steps), the controller can damp out oscillations up to a volume displacement of 6 mm$^3$. This approach imparts exceptional stability in systems likely to oscillate (or resonate) while maintaining the high degree of accuracy for all systems.

The electronics includes various features to protect the pressure control unit from damage in the event of misuse or procedural errors when in operation. Two detectors are used to indicate when the piston approaches the limit of available travel. The A-D converter also generates two signals indicating a negative pressure or an excess pressure applied to the transducer (Polarity error and overrun, respectively). Detection of an error condition will result in a red flashing LED being displayed on the control panel, and the increase/-decrease volume decision being overruled, stepping the motor in the appropriate direction to correct the error.

The digitised pressure reading is displayed on the control panel as a 4 digit 7 segment LED display. Step pulses driven to the stepper motor also increment or decrement a counter, the value of which is also displayed on a 6 digit 7 segment LED display. This count is set to zero by the zero/reset switch on the control panel, and will thereafter represent the volume change in mm$^3$ necessary to obtain the required pressure.

Two additional controls are available on the panel, a hold volume switch and a zero offset adjustment for the A-D converter. When hold volume is set, the piston will be held in position by the stepper motor holding force irrespective of the detected pressure. Zero offset allows the detected pressure to be set to zero over an absolute pressure range of approximately 100 kPa enabling a pressure resulting from the head of water between the device and the test specimen to be eliminated.

The bus interface unit 72 also interrupts the CPU, enabling operations to be controlled by a remote computer and allowing data to be monitored for recording and analysis.

Pressure and volume information are continually made available to the interface together with all error conditions. This may be monitored without the computer effecting any control.

When operating as a peripheral controlled by a computer, the computer issues a command to the unit detailing pressure or volume control. A pressure control command is followed by the required pressure, and the unit will then ignore the thumbwheel setting and seek to the computer specified pressure. Computer volume control overrules the comparison result (but not the error detection) and causes the stepper motor to drive at maximum speed (1000 steps per second) to achieve the set target volume change. The command also indicates the required direction.

A non flashing LED on the panel indicates computer control, which may be cancelled either by the computer, or by operating the 'ZERO/RESET' switch.

I claim:

1. A liquid pressure source comprising a piston and cylinder unit embodying a cylinder having at one end a pressure outlet, a piston in the cylinder movable reciprocally therein to generate a pressure at said outlet, a recirculating ball screw assembly at the other end of the cylinder, a threaded piston rod connected at one end to the piston, said threaded piston rod extending from the piston through said recirculating ball screw at said other end of the cylinder, a stepping motor, means non-rotatably supporting the stepping motor for rectilinear movement relative to the cylinder, said stepping motor including a rotor, means connecting the rotor to said piston rod such that rotation of the piston rod by way of the recirculating ball screw effects rectilinear movement of the stepping motor and piston, a pressure transducer at said one end of the cylinder operable to produce electric signals indicative of the fluid pressure generated at the outlet of the cylinder, means for generating signals representing the desired pressure, a digital feedback control means responsive to said transducer signals and to the signals representing said desired pressure to provide said stepping impulses to said stepping motor in a sense such as to reduce the difference between the actual and the desired pressure and a volume charge counter means coupled to said digital feedback control means to count said stepping pulses so as to indicate the change in volume.

2. A liquid pressure source according to claim 1, in which the control means is adapted in a selectable alternative mode of operation to provide stepping pulses in response to an electrical input representative of a desired volume change.

3. A liquid pressure source according to claim 1, in which the feedback control means includes means for computing whether or how many steps are required to be made, and in which, following a change in motor direction, the computation is suspended until a predetermined pressure change is detected by the pressure transducer.

4. A liquid pressure source according to claim 3, in which said predetermined pressure change increases on successive reversals of the motor direction.

5. A liquid pressure source according to claim 1, in which the feedback control means includes means for computing whether or how many steps are required to be made, the computing means being arranged to operate only when a predetermined number of motor steps have taken place since the last change in the direction of rotation of the motor.

6. A liquid pressure source according to claim 1 wherein the feedback control means includes means for computing whether or how many steps are required to be made, the computing means being arranged to operate only when a predetermined number of motor steps have taken place since the last change in the direction of rotation of the motor.

7. A liquid pressure source according to claim 1 wherein, following a change in motor direction, the computation is suspended until a predetermined pressure change is detected by the pressure transducer.

8. A liquid pressure source according to claim 7, in which said predetermined pressure change increases on successive reversals of the motor direction.

9. A liquid pressure source according to claim 1 comprising means arranged in operation when a motor step has been effected to compute the change between the transducer signal before and after the step and to supress further motor steps unless or until the difference between the target and transducer signals is least equal to half the said change and whenever said difference exceeds said change to a predetermined extent to generate a plurality of motor stopping pulser.

10. A liquid pressure source comprising a cylinder having at one end a pressure outlet, a piston in the cylinder, a threaded piston rod connected to the piston and extended therefrom through the other end of the cylinder, a stepping motor, means non-rotatably supporting the stepping motor for rectilinear movement relative to the cylinder, said stepping motor including a rotor, means connecting the rotor to the piston rod such that rotation of the rotor effects rotation of the piston rod, a ball screw mechanism at said other end of the cylinder through which the threaded piston rod extends operable in response to rotation of the piston rod to effect rectilinear movement of the stepping motor and the piston relative to the cylinder, a pressure transducer at said one end of the cylinder operable to produce an electric signal indicative of the fluid pressure at the outlet of the cylinder, means for generating a signal responsive to the desired pressure and digital feedback control means representing the transducer signal and to the signal representing the desired pressure to provide stepping pulses to the stepping motor in a sense such as to reduce the difference between the actual and the desired pressure.

11. A liquid pressure source according to claim 10, in which the pressure transducer is an analogue pressure transducer followed by an analogue to digital converter.

12. A liquid pressure source according to claim 10 wherein said control means includes oscillation inhibiting means adapted, when a predetermined degree of motor movement has been effected, to compute the change between the transducer signal before and after the said movement, and to suppress further movement unless or until the difference between the target and transducer signals is at least equal to half the said change.

13. A liquid pressure source according to claim 12, in which the feedback control means additionally includes means arranged, whenever the said difference exceeds said change to a predetermined extent, to generate a plurality of motor stepping pulses at a rate greater than that at which single pulses are generated.

14. A liquid pressure source comprising a piston cylinder unit, a stepping motor arranged to actuate the piston cylinder unit by a predetermined amount for each of a series of received stepping pulses, a pressure transducer arranged to product an electrical signal indicating liquid pressure at the output of the piston cylinder unit, digital feedback control means responsive to the transducer signal and to signals representing the desired target pressure to provide said stepping pulses to said stepping motor in a sense such as to reduce the difference between the actual and the desired pressure, volume change counter means coupled to said digital feedback control means to count said stepping pulses so as to indicate change in volume, said feedback control means including backlash compensating means which, following a change in motor direction, applies pulses to the motor but not to the volume change counter means until a predetermined pressure change is detected by the pressure transducer.

* * * * *